United States Patent [19]

Leaver

[11] Patent Number: 5,928,388
[45] Date of Patent: Jul. 27, 1999

[54] DYE MIXTURES

[75] Inventor: Alan Thomas Leaver, Manchester, United Kingdom

[73] Assignee: BASF Aktiengesellschaft, Ludwigshafen, Germany

[21] Appl. No.: 08/981,827

[22] PCT Filed: Jun. 26, 1996

[86] PCT No.: PCT/GB96/01532

§ 371 Date: Apr. 10, 1998

§ 102(e) Date: Apr. 10, 1998

[87] PCT Pub. No.: WO97/04031

PCT Pub. Date: Feb. 6, 1997

[30] Foreign Application Priority Data

Jul. 15, 1995 [GB] United Kingdom .................... 9514524

[51] Int. Cl.⁶ ............................. C09B 67/22; C09B 57/00
[52] U.S. Cl. ........................... 8/638; 8/922; 8/445; 8/456; 8/934

[58] Field of Search ................................. 8/638, 922, 445, 8/456, 934

[56] References Cited

FOREIGN PATENT DOCUMENTS

| A2 0 146 269 | 6/1985 | European Pat. Off. . |
| 492893 | 7/1992 | European Pat. Off. . |
| A2 0 492 893 | 7/1992 | European Pat. Off. . |
| A1 0 574 148 | 12/1993 | European Pat. Off. . |
| A1 0 598 303 | 5/1994 | European Pat. Off. . |

*Primary Examiner*—Alan Diamond
*Attorney, Agent, or Firm*—Oblon, Spivak, McClelland, Maier & Neustadt, P.C.

[57] ABSTRACT

A disperse dye mixture which comprises, on a weight basis, from 5% to 70% of the dye of Formula (1), from 5% to 70% of the dye of Formula (2), and from 0% to 40% of the dye of Formula (3), wherein each of R and $R^1$ represents an alkylene group and each of $R^2$ and $R^3$ represents an alkyl group.

19 Claims, No Drawings

DYE MIXTURES

This application is a 371 of PCT/GB96/01532 filed Jun. 26, 1996.

BACKGROUND OF THE INVENTION

The present invention relates to a mixture of dyes, particularly a mixture of disperse polycyclic dyes, to a process for the coloration of synthetic textile materials and to textile materials when coloured with the mixture of dyes.

DESCRIPTION OF THE BACKGROUND

Polycyclic dyes are known (EP 0033583 and EP 0146269) and may be applied to synthetic textile materials by various dyeing techniques such as exhaust or continuous dyeing or printing. Generally, textile materials, when dyed or printed with such dyes, exhibit very high levels of wet-fastness. However, it is difficult to achieve heavy shades on textile materials with these dyes particularly when exhaust dyeing is carried out at 130° C., the most common temperature for batch dyeing polyester. Under these conditions, yields and levelling are usually poor and exhaustion is relatively low with much of the dye remaining in the dyebath. This poor performance can be overcome to some extent by increasing the dyeing temperature but not sufficiently to allow trouble free dyeing.

SUMMARY OF THE INVENTION

According to the present invention, there is provided a disperse dye mixture which comprises, on a weight basis, from 5% to 70% of the dye of Formula (1):

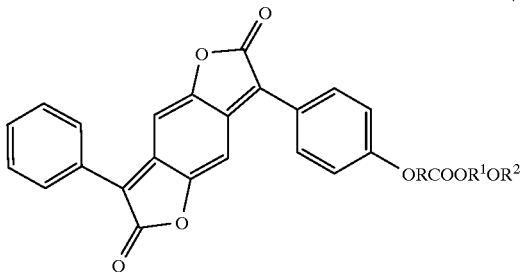

Formula (1)

from 5% to 70% of the dye of Formula (2)

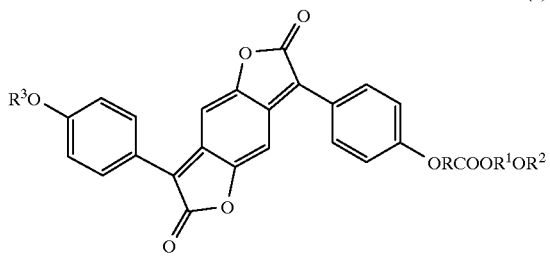

Formula (2)

and from 0% to 40% of the dye of Formula (3):

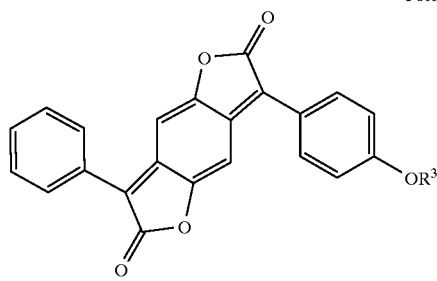

Formula (3)

wherein each of R and $R^1$ represents an alkylene group and each of $R^2$ and $R^3$ represents an alkyl group.

DETAILED DESCRIPTION OF THE INVENTION

The alkylene groups represented by R and $R^1$ are preferably $C_{1-8}$-alkylene groups, more preferably $C_{1-6}$-alkylene groups and especially $C_{1-4}$-alkylene groups. It is especially preferred that R is methylene and $R^1$ is methylene or ethylene.

The alkyl groups represented by $R^2$ and $R^3$ are preferably $C_{1-8}$-alkyl groups more preferably $C_{1-6}$-alkyl groups and especially $C_{1-4}$-alkyl groups. It is especially preferred that $R^2$ is methyl or ethyl and $R^3$ is propyl.

The present dye mixture has improved dyeing properties and allows heavy depths of shade to be obtained at 130° C. with improved levelling properties and improved exhaustion over commercially available dyes. Furthermore, the dye mixture provides a commercially popular shade.

The dye mixture preferably comprises from 5% to 70%, more preferably from 10% to 30%, by weight of the dye of Formula (1), from 5% to 70%, more preferably from 40% to 60%, by weight of the dye of Formula (2) and from 5% to 40%, more preferably from 10% to 35%, by weight of the dye of Formula (3).

An especially preferred dye mixture comprises from 16% to 21% by weight of the dye of Formula (1), from 50% to 55% by weight of the dye of Formula (2) and from 26% to 31 % by weight of the dye of Formula (3).

An especially preferred mixture of dyes comprises a dye of Formula (1) in which R is —$CH_2$—, $R^1$ is —$C_2H_4$— and $R^2$ is —$C_2H_5$, a dye of Formula (2) in which R is —$CH_2$—, $R^1$ is —$C_2H_4$—, $R^2$ is —$C_2H_5$ and $R^3$ is n-propyl and a dye of Formula (3) in which $R^3$ is n-propyl.

The mixture of dyes according to the invention may a be simple physical mixture or may be mixed crystals formed, for example, by co-crystallisation or co-synthesis. Crystalline modifications of compounds of Formulae (1), (2) and (3) exist and it is intended that the present definition includes such crystalline modifications which may be formed by established treatments such as heat treatment, solvent treatment, recrystallisation or seeding.

According to a further feature of the present invention, there is provided a process for colouring a synthetic textile material or fibre blend thereof which comprises applying to the synthetic textile material a disperse dye mixture as hereinbefore defined.

The synthetic textile material may be selected from secondary cellulose acetate, cellulose triacetate, polyamide, polyacrylonitrile and aromatic polyester. The synthetic textile material is preferably polyamide such as polyhexamethylene adipamide or aromatic polyester, especially polyethylene terephthalate. Fibre blends may comprise mixtures of different synthetic textile materials or mixtures of synthetic and natural textile materials. Preferred fibre blends include those of polyester cellulose such as polyester- cotton. The textile materials or blends thereof may be in the form of filaments, loose fibres, yarn or woven or knitted fabrics.

The mixture of dyes according to the invention, optionally in conjunction with other disperse dyes, may be applied to the synthetic textile materials or fibre blends thereof by processes which are conventionally employed in applying disperse dyes to such materials and fibre blends.

Suitable process conditions include the following:
i) exhaust dyeing at a pH of from 4 to 6.5, at a temperature of from 125° C. to 140° C. for from 10 to 120 minutes and under a pressure of from 1 to 2 bar, a sequestrant optionally being added;
ii) continuous dyeing at a pH of from 4 to 6.5, at a temperature of from 190° C. to 225° C. for from 15 seconds to 5 minutes, a migration inhibitor optionally being added;
iii) printing direct at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for 10 to 45 minutes for pressure steaming, wetting agents and thickeners (such as alginates) of from 5 to 100% by weight of the dye optionally being added;
iv) discharge printing (by padding the dye on to the textile material, drying and overprinting) at a pH of from 4 to 6.5, migration inhibitors and thickeners optionally being added;
v) carrier dyeing at a pH of from 4 to 6.5, at a temperature of from 95° C. to 100° C. using a carrier such as methyinaphthalene, diphenylamine or 2-phenylphenol, sequestrants optionally being added.

In all the above processes, the mixture of dyes according to the invention is applied as a dispersion comprising from 0.001% to 4% by weight of the dye mixture in aqueous medium.

Compositions comprising dispersions of the disperse dye mixture of the invention form a further feature of the present invention. The compositions typically comprise from 1% to 30% by weight of a mixture of the dyes in an aqueous medium. The compositions are preferably buffered at pH 2 to 7, more preferably at pH 4 to 6.

The dye dispersions may further comprise ingredients conventionally used in coloration applications such as dispersing agents, for example lignosulphonates, naphthalene sulphonic acid/formaldehyde condensates or phenol/cresol/sulphanilic acid/formaldehyde condensates, surfactants, wetting agents such as alkyl aryl ethoxylates which may be sulphated, sulphonated or phosphated, inorganic salts, de-foamers such as mineral oil or nonanol, organic liquids and buffers. Dispersing agents may be present at from 10% to 200% on the weight of the dye mixture. Wetting agents may be used at from 0% to 20% on the weight of the dye mixture. The dispersions may be prepared by bead milling the dye mixture with glass beads or sand in an aqueous medium or by combining dispersions of milled dyes.

Dispersions may be dried, after the addition of any extra dispersing agents, to give a solid physical form with from 5 to 60% by weight of total colour.

In addition to the above-mentioned application processes, the dye mixtures of the invention may be applied to synthetic textile materials and fibre blends by ink-jet printing, the substrates optionally having been pre-treated to aid printing. For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_1$–$C_4$-alkanol, especially methanol or ethanol, a ketone, especially acetone, methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

The dye mixture may also be applied to textile materials using supercritical fluid solvents, for example supercritical carbon dioxide, in which case the dye formulating agents may optionally be omitted.

The dyes of Formulae (1), (2) and (3) may be prepared by the processes described in EP 0033583 and EP 0146269.

The invention is further illustrated but not limited by the following Examples in which all percentages are by weight:

EXAMPLE 1

A mixture comprising 18.8% of Dye 1, 52.6% of Dye 2 and 28.6% of Dye 3 was prepared and used to dye polyester textile material by an exhaust dyeing technique at 130° C. The degree of exhaustion was measured by comparing the amount of dye initially added to the dyebath with that remaining after dyeing, when twice the amount of dye needed to achieve a 1/1 Standard Depth of shade was initially employed. Comparison was by solution measurement using an absorption Spectrophotometer, capable of measuring the concentration of dye in solution in the visible region of the Electromagnetic Spectrum. The degree of exhaustion was >90%.

The levelling property was assessed by measuring the reflectance of a dyed piece of polyester fibre at 1/1 Standard Depth of Shade. This value was taken as 100%. This was compared with the reflectance from an initially undyed piece of polyester, which was held for 1 hour at 130° C. in a blank dyebath in the presence of an identical dyed piece, and the dye transferred to the undyed piece was expressed as a percentage of the original dyed piece.

Dyes 1, 2 and 3 have the structures shown below, Dye 1 being a dye of Formula (1), Dye 2 a dye of Formula (2) and Dye 3 a dye of Formula (3):

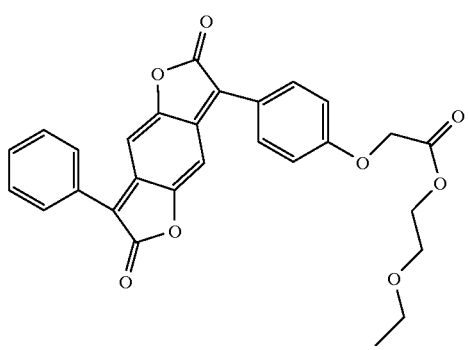

Dye 1

-continued

Dye 2

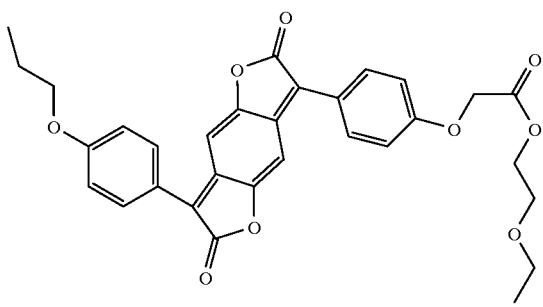

Dye 3

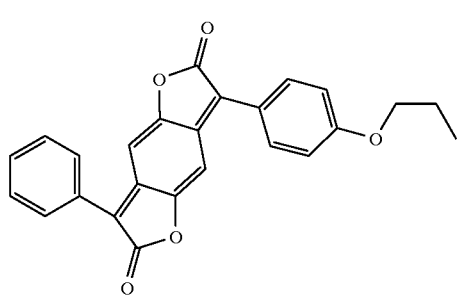

COMPARATIVE EXAMPLE A

A preparation using only one dye (Dye 3) was used to dye polyester textile material under identical conditions to those used in Example 1 and to an equivalent depth of shade. The degree of exhaustion was less and the levelness of the dyeing was inferior compared with the dye mixture of the invention used in Example 1.

COMPARATIVE EXAMPLE B

A preparation using only one dye (Dye 2) was used to dye polyester textile material under identical conditions to those used in Example 1 and to an equivalent depth of shade. The degree of exhaustion was less and the levelness of the dyeing was inferior compared with the dye mixture of the invention used in Example 1.

EXAMPLES 2–17

Further dye mixtures based on Dyes 1, 2 and 3, described in Example 1, were applied to polyester textile material under the conditions described in Example 1. There again showed superior exhaustion and level dyeing properties compared with the single dyes used in Comparative Examples A and B. The mixtures had the following compositions:

| Example | % of Dye 1 | % of Dye 2 | % of Dye 3 |
|---------|------------|------------|------------|
| 2 | 33 | 67 | 0 |
| 3 | 10 | 60 | 30 |
| 4 | 12 | 55 | 33 |
| 5 | 14 | 55 | 31 |
| 6 | 16 | 55 | 29 |
| 7 | 17 | 52 | 31 |
| 8 | 19 | 54 | 27 |
| 9 | 20 | 55 | 25 |
| 10 | 20 | 50 | 30 |
| 11 | 25 | 50 | 25 |

-continued

| Example | % of Dye 1 | % of Dye 2 | % of Dye 3 |
|---------|------------|------------|------------|
| 12 | 25 | 60 | 15 |
| 13 | 27 | 48 | 25 |
| 14 | 30 | 55 | 15 |
| 15 | 30 | 40 | 30 |
| 16 | 30 | 65 | 5 |
| 17 | 30 | 60 | 10 |

EXAMPLE 18–42

Further mixtures of dyes were prepared. The dyes had the following structure, Dyes 4, 7 and 10 being dyes of Formula (1), Dyes 5, 8 and 11 being dyes of Formula (2) and Dyes 6, 9 and 12 being dyes of Formula (3):

Dye 4

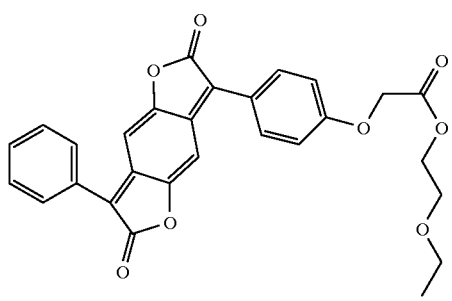

Dye 5

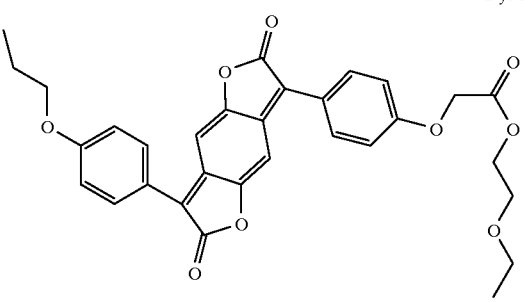

Dye 6

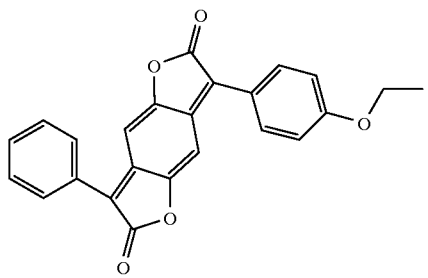

Dye 7

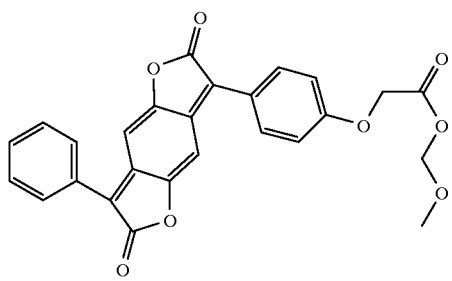

Dye 8

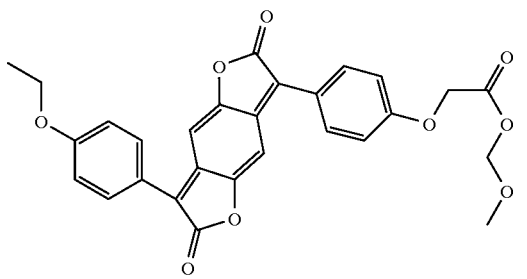

Dye 9

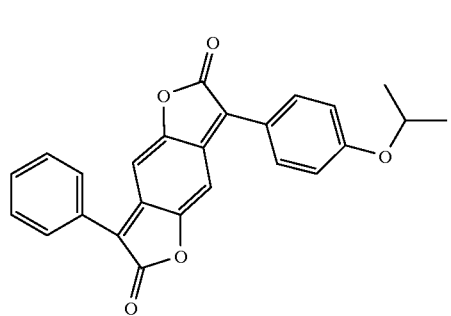

Dye 10

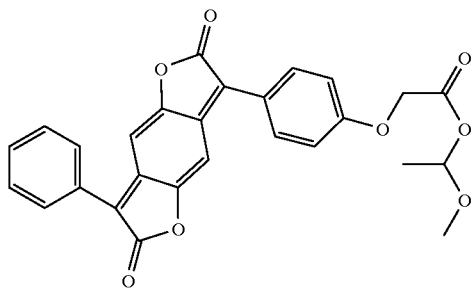

Dye 11

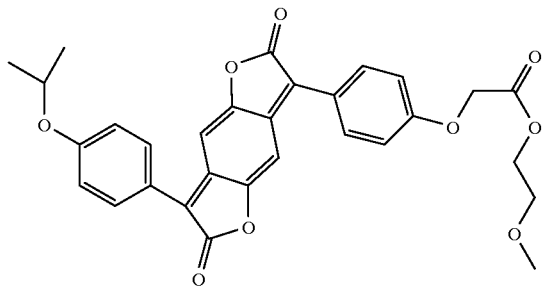

Dye 12

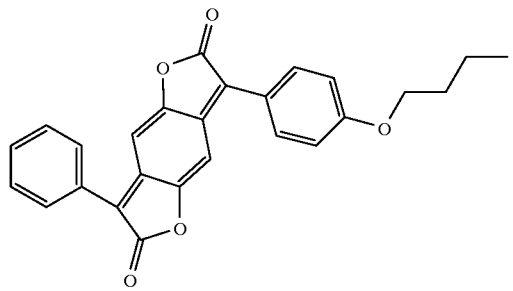

Mixtures of the above dyes were applied to polyester in the same manner as in Example 1, as follows:

| Example | % of Dye 4 | % of Dye 5 | % of Dye 6 | % of Dye 7 | % of Dye 8 | % of Dye 9 | % of Dye 10 | % of Dye 11 | % of Dye 12 |
|---|---|---|---|---|---|---|---|---|---|
| 18 | 12 | 55 | 33 | | | | | | |
| 19 | 16 | 55 | 29 | | | | | | |
| 20 | 14 | | | | 55 | 31 | | | |
| 21 | | 54 | | 19 | | 27 | | | |
| 22 | | 50 | | 25 | | 25 | | | |
| 23 | | | 25 | 20 | 55 | | | | |
| 24 | | 52 | | 17 | | | | | 31 |
| 25 | | | | | | | 30 | 55 | 15 |
| 26 | 12 | | | | 55 | | | | 33 |
| 27 | | 55 | | 16 | | | | | 29 |
| 28 | | | 29 | | 55 | 16 | | | |
| 29 | | | 33 | 12 | | | | 55 | |
| 30 | | | 16 | 55 | 29 | | | | |
| 31 | | | | | | | 12 | 55 | 33 |
| 32 | | | | | | | 16 | 55 | 29 |
| 33 | 27 | 48 | 25 | | | | | | |
| 34 | | | 27 | 48 | 25 | | | | |
| 35 | | | | | | | 27 | 48 | 25 |
| 36 | 19 | | | | 54 | | | | 27 |
| 37 | 19 | 54 | | | | 27 | | | |
| 38 | | | | 24 | 59 | | | | 17 |
| 39 | 18.8 | | | | 52.6 | | | | 28.6 |
| 40 | | | | 18.8 | 52.6 | | | | 28.6 |
| 41 | | 52.6 | | | | | 28.6 | 18.8 | |
| 42 | | | 28.6 | 18.8 | | | | 52.6 | |

These mixtures again showed level dyeing and exhaustion properties superior to the individual components.

I claim:

1. A disperse dye mixture which comprises, on a weight basis, from 5% to 70% of the dye of Formula (1):

Formula (1)

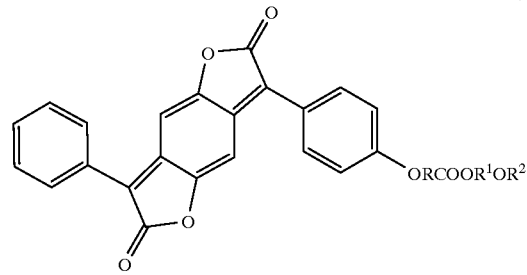

from 5% to 70% of the dye of Formula (2):

Formula (2)

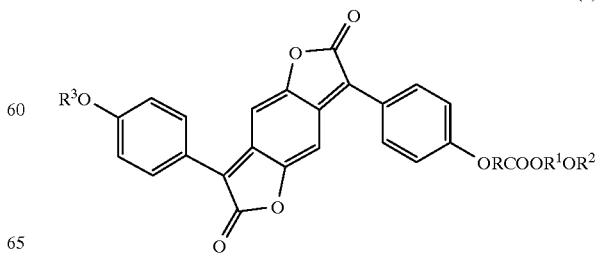

and from 0% to 40% of the dye of Formula (3):

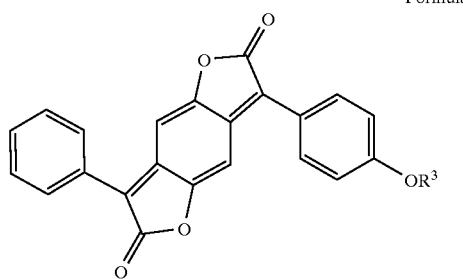

Formula (3)

wherein each of R and $R^1$ represents an alkylene group and each of $R^2$ and $R^3$ represents an alkyl group.

2. The dye mixture according to claim 1 which comprises from 5% to 70% by weight of the dye of Formula (1), from 5% to 70% by weight of the dye of Formula (2) and from 5% to 40% by weight of the dye of Formula (3).

3. The dye mixture according to claim 2 which comprises from 10% to 30% by weight of the dye of Formula (1), from 40% to 60% by weight of the dye of Formula (2) and from 10% to 35% by weight of the dye of Formula (3).

4. The dye mixture according to claim 3 which comprises from 16% to 21% by weight of the dye of Formula (1), from 50% to 55% by weight of the dye of Formula (2) and from 26% to 31% by weight of the dye of Formula (3).

5. The dye mixture according to claim 1 wherein in the dye of Formula (1) R is $-CH_2-$, $R^1$ is $-C_2H_4-$ and $R^2$ is $-C_2H_5$, in the dye of Formula (2) R is $-CH_2-$, $R^1$ is $-C_2H_4$, $R^2$ is $-C_2H_5$ and $R^3$ is n-propyl, and in the dye of Formula (3) $R^3$ is n-propyl.

6. The dye mixture according to claim 1, wherein said dye of the formula (1) or formula (2) is in crystalline form.

7. The dye mixture according to claim 1, wherein said dye of the formula (1) and said dye of the formula (2) are each in crystalline form.

8. The dye mixture according to claim 2, wherein said dye of the formula (1), (2) and (3) are each in crystalline form.

9. The dye mixture according to claim 1, wherein R and $R^1$ are each $C_1$–$C_4$ alkylene, and $R^2$ and $R^3$ are each $C_1$–$C_4$ alkyl.

10. A composition comprising from 1% to 30% by weight of a dye mixture as defined in claim 1 dispersed in an aqueous medium.

11. The composition according to claim 10 containing 1% to 30% by weight of a dye mixture, wherein said dye mixture comprises 5 to 70% by weight of the dye of Formula (1), 5 to 70% by weight of the dye of Formula (2), and 5 to 40% by weight of the dye of Formula (3).

12. The composition according to claim 10, which is buffered at a pH of 2 to 7.

13. The composition according to claim 12, which is buffered at a pH of 4 to 6.

14. A process for colouring a synthetic textile material or fiber blend thereof which comprises applying to the synthetic textile material of fiber blend thereof a dye mixture as defined in claim 1.

15. The process for coloring a synthetic textile material or a fiber blend thereof comprising applying to the synthetic textile material or fiber blend thereof a dye mixture as defined in claim 2.

16. The process according to claim 14, wherein said synthetic textile material or fiber blend thereof is selected from the group consisting of secondary cellulose acetate, cellulose triacetate, polyamide, polyacrylonitrile and aromatic polyester.

17. The process according to claim 16, wherein said polyamide is polyhexamethylene adipamide.

18. The process according to claim 16, wherein said aromatic polyester is polyethylene terephthalate.

19. The process according to claim 14, wherein said dye mixture is applied as a dispersion comprising from 0.001% to 4% by weight of the dye mixture in aqueous medium.

* * * * *